A. HERRMANN & I. N. GOLLODAY.
GOPHER TRAP.
APPLICATION FILED JAN. 31, 1908.

899,595.

Patented Sept. 29, 1908.

WITNESSES
Alex Currie
E. G. Medina

INVENTORS
Arthur Herrmann
Isaac N. Golloday
BY
Medina & Griffin
ATTORNEYS

UNITED STATES PATENT OFFICE.

ARTHUR HERRMANN AND ISAAC N. GOLLODAY, OF COLMA, CALIFORNIA.

GOPHER-TRAP.

No. 899,595.　　　　　Specification of Letters Patent.　　Patented Sept. 29, 1908.

Application filed January 31, 1908. Serial No. 413,531.

*To all whom it may concern:*

Be it known that we, ARTHUR HERRMANN and ISAAC N. GOLLODAY, citizens of the United States, residing at Colma, in the county of San Mateo and State of California, have invented a new and useful Gopher-Trap, of which the following is a specification in such full and clear terms as will enable those skilled in the art to construct and use the same.

This invention relates to traps used for the purpose of catching and killing gophers and other rodents of the burrowing kind and its object is to provide means to prevent the animal from covering the trigger with a pile of fine dirt which will prevent the trap from being sprung. These small animals push a large amount of fine dirt ahead of them in their burrowings and this dirt is usually pushed over the trap and under the trigger so that when the animal's foot comes in contact with the trigger the dirt supports the trigger and holds the trap in its original position and allows the animal to pass over it with impunity.

Figure 1:
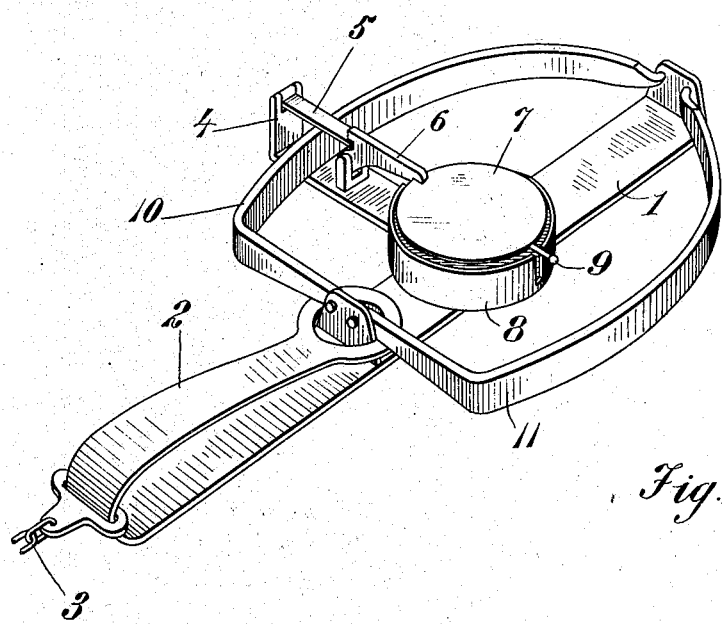
Figure 2:
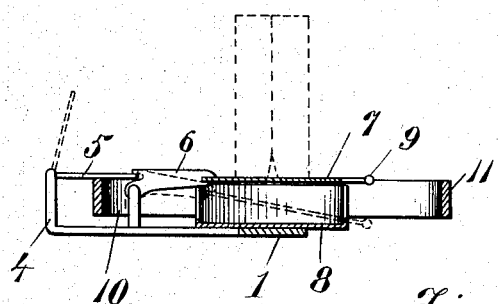

In the drawings in which the same numeral is applied to the same parts throughout, Figure 1 is a perspective view of the trap, and Fig. 2 is a cross section view of the trap showing the trigger casing.

The numeral 1 represents the main spring of the trap which has the common lifting spring 2 to close the jaws 10 and 11. At one side of the main spring 1 is the arm 4 which has the latch 5 secured to it, as is the trigger 6, said trigger having a larger round plate 7 for the animal to place its foot on. The trouble with a trap made in this way without any additional feature is that the animal pushes fine dirt over and under the foot trigger thus preventing it from being pushed down when the animal steps on it. To prevent the dirt from being pushed under the trigger the small pan 8 is secured to the main spring 1, said pan being of substantially the same size as the foot plate 7. In order that it may be easy to set the trap a very small pin is secured to the foot plate and it operates through a slot in the side of the pan 8.

When dirt is pushed over the trap it cannot get under the foot plate and the slightest weight on the same springs the jaws and catches the animal.

Having thus described our invention what we claim as new and desire to secure by Letters Patent of the United States is as follows:

In a gopher trap, the combination of a pair of spring pressed jaws, means for holding the jaws open and including means for springing them, a pan through which the springing means moves, and a setting pin attached to the springing means and passing through the side of the pan.

In testimony whereof we have set our hands this 26" day of December A. D. 1907, in the presence of the two subscribed witnesses.

ARTHUR HERRMANN.
　　　　　ISAAC N. GOLLODAY.

Witnesses:
　W. T. HESS,
　E. G. MEDINA.